United States Patent
Vashi et al.

(10) Patent No.: US 9,763,153 B2
(45) Date of Patent: Sep. 12, 2017

(54) CDMA/MULTIMODE VOLTE DEVICE WITH REDUCED TIME TO CAMP

(71) Applicant: Apple Inc., Cupertino, CA (US)

(72) Inventors: Prashant H. Vashi, Sunnyvale, CA (US); Vikram B. Yerrabommenahalli, Sunnyvale, CA (US); Abhishek Sen, San Jose, CA (US); Bharath Narasimha Rao, Sunnyvale, CA (US); Yannick L. Sierra, San Francisco, CA (US)

(73) Assignee: Apple Inc., Cueprtino, CA (US)

( * ) Notice: Subject to any disclaimer, the term of this patent is extended or adjusted under 35 U.S.C. 154(b) by 98 days.

(21) Appl. No.: 14/727,958

(22) Filed: Jun. 2, 2015

(65) Prior Publication Data
US 2016/0360456 A1    Dec. 8, 2016

(51) Int. Cl.
*H04W 36/14* (2009.01)
*H04B 7/26* (2006.01)

(52) U.S. Cl.
CPC .......... *H04W 36/14* (2013.01); *H04B 7/2628* (2013.01)

(58) Field of Classification Search
CPC .. H04B 7/18541; H04L 47/767; H04W 36/00; H04W 36/0005; H04W 36/0016; H04W 8/183
USPC ......................................................... 370/331
See application file for complete search history.

(56) References Cited

U.S. PATENT DOCUMENTS

| | | | |
|---|---|---|---|
| 9,119,173 B1* | 8/2015 | Krishnamoorthy ... | H04W 68/02 |
| 2013/0329639 A1* | 12/2013 | Wietfeldt .............. | H04W 88/06 370/328 |
| 2015/0126187 A1* | 5/2015 | Ponukumati .......... | H04W 72/02 455/434 |
| 2015/0230070 A1* | 8/2015 | Kadiyala ................. | H04W 4/16 455/417 |
| 2015/0296369 A1* | 10/2015 | Berionne .............. | H04W 8/183 455/418 |
| 2015/0312717 A1* | 10/2015 | Shih ...................... | H04W 8/183 455/456.1 |
| 2016/0050599 A1* | 2/2016 | Yang .................. | H04W 36/0022 455/436 |
| 2016/0295541 A1* | 10/2016 | Jaiswal ................. | H04W 48/12 |

* cited by examiner

*Primary Examiner* — Chi H Pham
*Assistant Examiner* — Robert Lopata
(74) *Attorney, Agent, or Firm* — Meyertons, Hood, Kivlin, Kowert & Goetzel, P.C.

(57) ABSTRACT

A user equipment (UE) may camp on a network following a SIM bootup. Specifically, the UE may determine that a SIM implementation module of the UE includes a first SIM application (e.g., USIM) associated with a first cellular radio access technology (RAT) (e.g., LTE) and a second SIM application (e.g., CSIM) associated with a second cellular RAT (e.g., CDMA). The UE may then initialize the first SIM application and the second SIM application. The UE may determine whether the network is configured to support both voice and data communications using the first cellular RAT. If so, the UE may initiate camping on the network with the first cellular RAT in response to determining that the first SIM application is ready, but before the second SIM application is ready. If not, the UE may wait until both the first and second SIM applications are ready before initiating camping on the network.

20 Claims, 5 Drawing Sheets

CDMA/MULTIMODE VOLTE DEVICE WITH REDUCED TIME TO CAMP

TECHNICAL FIELD

The present application relates to wireless devices, and more particularly to reducing the time to camp on SIM bootup for a wireless device capable of both packet-switched and circuit-switched voice communications.

DESCRIPTION OF THE RELATED ART

The use of wireless communication systems is rapidly expanding. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed. One example of a transition to next generation wireless technology is the transition from CDMA to LTE, including voice over LTE (VoLTE). Accordingly, some wireless devices may be configured to utilize both CDMA and LTE networks.

Wireless devices which use cellular communication technologies are frequently equipped with subscriber identity modules (SIMs), which may include various subscriber identity and/or device provisioning information which may be used to configure the wireless device for cellular communication. Wireless devices utilizing multiple wireless communication technologies may be equipped with multiple SIMs, or with a SIM having multiple SIM applications.

SUMMARY

In light of the foregoing and other concerns, some embodiments relate to one or more user equipment (UE) devices and cellular network devices which are configured to reduce time to camp following subscriber identity module (SIM) bootup.

A UE is presented, which may comprise at least one antenna, a radio coupled to the at least one antenna for performing wireless cellular communications with a cellular network, and at least one processing element coupled to the radio. The UE may further comprise a SIM implementation module coupled to the radio, the SIM implementation module storing at least a first SIM application associated with a first cellular radio access technology (RAT) and a second SIM application associated with a second cellular RAT. The UE may be configured to initialize the first SIM application and the second SIM application. The UE may be further configured to initiate camping on the cellular network with the first cellular RAT before the second SIM application is ready, at least partially in response to determining that the first SIM application is ready.

The initiating camping on the cellular network with the first cellular RAT before the second SIM application is ready may be further in response to determining that the cellular network is configured to support both data and voice communications via the first cellular RAT. For example, the first cellular RAT may be LTE, and the UE may determine that the cellular network is configured to support VoLTE communications. As an example, the first SIM application may be a universal SIM (USIM) application and the second SIM application may be a CDMA SIM (CSIM) application. The SIM implementation module may further store an IP Multimedia Services Identity Module (ISIM).

The UE may be further configured to initiate camping on the cellular network with the second cellular RAT in response to determining that the second SIM application is ready, after the UE has initiated camping on the cellular network with the first cellular RAT.

The UE may be further configured to wait to initiate camping on the cellular network with the first cellular RAT until the second SIM application is ready, wherein initiating camping on the cellular network with the first cellular RAT is performed substantially simultaneously with initiating camping on the cellular network with the second cellular RAT, wherein the waiting to initiate camping is at least partially in response to determining that the cellular network is not configured to support both data and voice communications via the first cellular RAT.

A method is presented for camping on a cellular network. The method may comprise a UE determining that a SIM implementation module of the UE includes a first SIM application associated with a first cellular RAT and a second SIM application associated with a second cellular RAT. The method may further comprise initializing the first SIM application and initializing the second SIM application. The UE may then determine that the first SIM application is ready and, in response, initiate camping on the cellular network with the first cellular RAT before the second SIM application is ready.

The initiating camping on the cellular network with the first cellular RAT before the second SIM application is ready may be further in response to determining that the cellular network is configured to support both data and voice communications via the first cellular RAT. The first cellular RAT may be LTE, and the determining that the cellular network is configured to support both data and voice communications via the first cellular RAT may comprise determining that the cellular network is configured to support VoLTE communications. The first SIM application may be a USIM application and the second SIM application may be a CSIM application. The SIM implementation module may further store an IP Multimedia Services Identity Module (ISIM).

The method may further comprise initiating camping on the cellular network with the second cellular RAT in response to determining that the second SIM application is ready, after the UE is camped on the cellular network with the first cellular RAT.

At least one of the first SIM application or the second SIM application may be a virtual SIM.

The method presented may be implemented as a non-transitory computer readable medium storing program instructions executable by a processor of a user equipment (UE), which, when executed, cause the UE to perform the steps of the method.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

Figure 1:
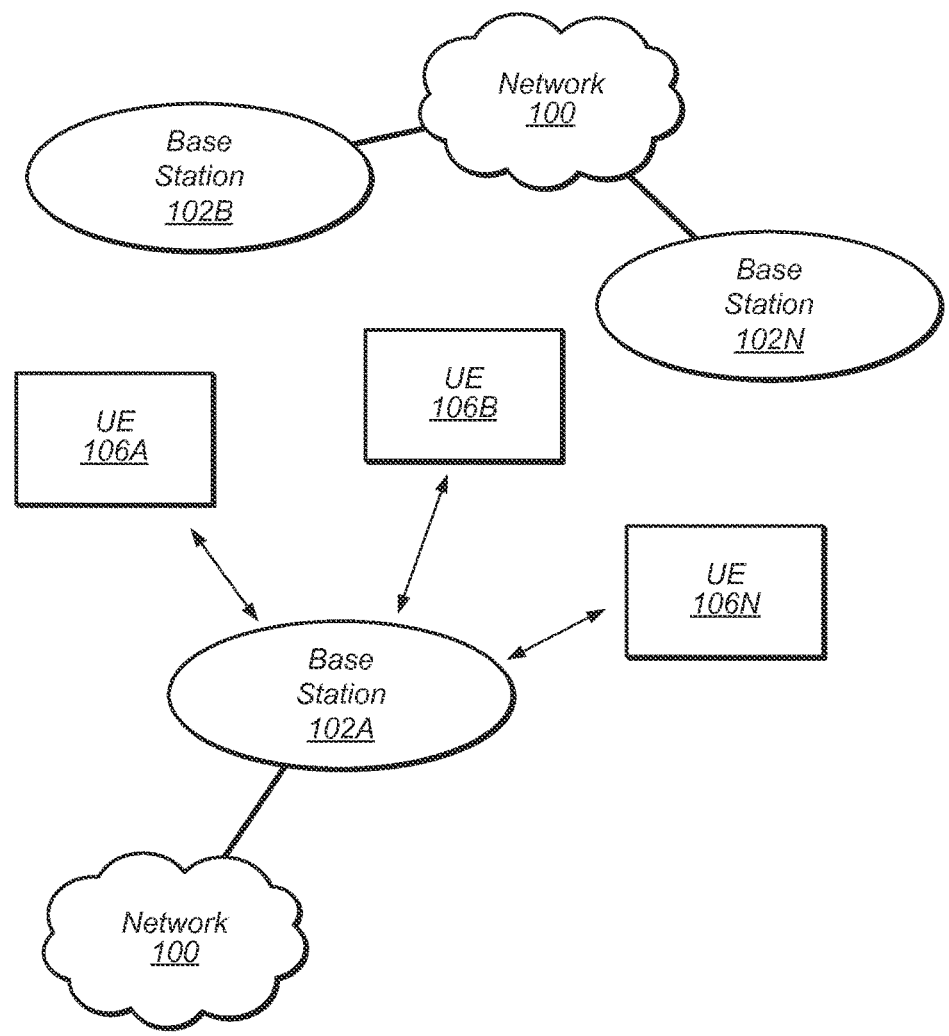
FIG. 1 illustrates an exemplary (and simplified) wireless communication system.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF THE EMBODIMENTS

Acronyms

The following acronyms are used in the present Patent Application:
UE: User Equipment
BS: Base Station
ENB: eNodeB (Base Station)
GSM: Global System for Mobile Communication
UMTS: Universal Mobile Telecommunication System
LTE: Long Term Evolution
CDMA: Code Division Multiple Access
CS: Circuit-switched
PS: Packet-switched
CSFB: Circuit-switched fallback
SIM: Subscriber Identity Module
eSIM: Embedded SIM
CSIM: CDMA SIM
USIM: Universal SIM
UICC: Universal Integrated Circuit Card
eUICC: Embedded UICC
IMSI: International Mobile Subscriber Identity
MME: Mobile Management Entity
MSC: Mobile Switching Center
RNC: Radio Network Controller
OAM: Operations, Administration, and Management
RRC: Radio Resource Control
IMS: IP Multimedia Subsystem

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as smart watches, smart glasses, headphones, pendants, earpieces), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
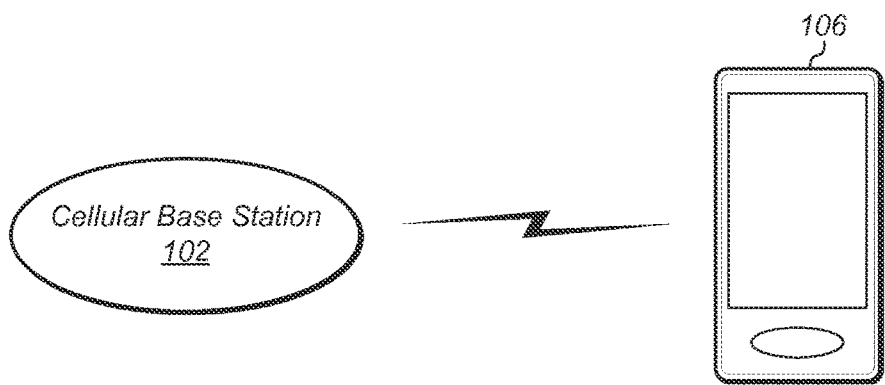
FIG. 2 illustrates a base station in communication with user equipment (UE)
Figure 3:
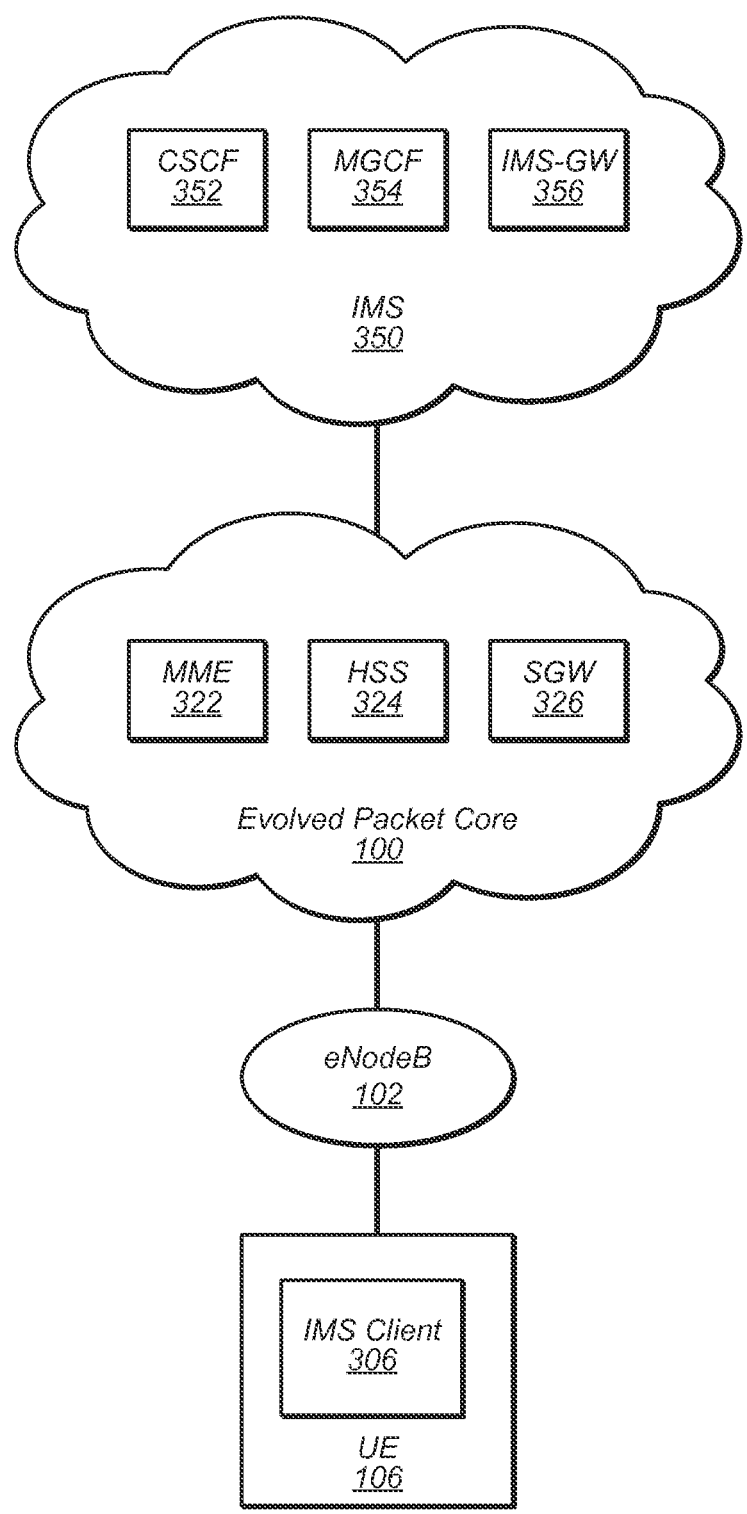
FIG. 3 illustrates an example cellular network system according to some embodiments.

FIGS. 1-3—Communication System

FIG. 1 illustrates a simplified example wireless cellular communication system. It is noted that the system of FIG. 1 is merely one example of a possible cellular communication system, and the present disclosure may be implemented in any of various systems as desired.

As shown, the example wireless cellular communication system includes a base station 102 which communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless cellular communication with the UEs 106A through 106N. The base station 102 may also be equipped to communicate with a network 100. Thus, the base station 102 may facilitate communication between the UEs and/or between the UEs and the network 100. The communication area (or coverage area) of each base station may be referred to as a "cell." The base station 102 and the UEs may be configured to communicate over the transmission medium using any of various wireless communication technologies, including cellular radio access technologies (RATs) such as GSM, UMTS, LTE, LTE-Advanced, CDMA, W-CDMA, and any of various 3G, 4G, 5G or future telecom standards. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards. Other possible wireless communication technologies include wireless local area network (WLAN or WiFi), WiMAX, etc.

In some embodiments, UE 106 may be capable of communicating using multiple radio access technologies (RATs). For example, the UE 106 might be configured to communicate using two or more of GSM, UMTS, LTE, LTE-Advanced CDMA2000, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. As defined above, the UE 106 may be a device with wireless cellular network connectivity such as a mobile phone, a hand-held device, a computer or a tablet, or virtually any type of wireless device. The base station may be a cellular base station that communicates in a wireless cellular manner with one or more UEs. The base station may include a processing element such as one or more of a processor, an ASIC (application specific integrated circuit), an FPGA (field-programmable gate array) or some combination thereof.

The base station, such as the processing element in the base station, may perform any of the methods described herein, or any portion of any of the method embodiments described herein, as being performed by a base station. Other cellular network devices, described below, may also be configured to perform some or all of the methods described herein, possibly in conjunction with the base station.

The UE may include a processing element such as one or more of a processor, an ASIC (application specific integrated circuit), an FPGA (field-programmable gate array) or some combination thereof. The UE, such as the processing element in the UE, may perform any of the methods described herein as being performed by a UE.

In some embodiments, the UE 106 may be configured to communicate using any of multiple wireless communication protocols as described above. The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1×RTT (or other CDMA based protocol), and separate radios for communicating using each of Wi-Fi and Bluetooth. Other configurations are also possible. In some embodiments, the UE 106 may be configured to communicate using a radio access technology which provides both PS services and CS services.

FIG. 3 illustrates an example simplified portion of a wireless communication system that may be particularly useful for implementing voice or video over IP communication, such as voice over LTE (VoLTE) in an LTE network. As shown, the UE 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a cellular network, where the cellular network may comprise a base station 102, a core network 100 and an IMS system 350, as shown. The base station is shown in this example embodiment as an eNodeB 102. The UE 106 may communicate in a wireless manner with the base station (eNodeB) 102. In turn, the eNodeB 102 may be coupled to a core network, shown in this example embodiment as an evolved packet core (EPC) 100. As shown, the EPC 100 may include mobility management entity (MME) 322, home subscriber server (HSS) 324, and serving gateway (SGW) 326. The EPC 100 may also include various other devices known to those skilled in the art.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. Similar to the EPC 100, the IMS 350 may also include various other devices known to those skilled in the art.

Operations described herein as being performed by the cellular network may be performed by one or more of the cellular network devices shown in FIG. 3, such as one or more of base station, 102, MME 322, HSS 324, or SGW 326 in EPC 100, or CSCF 352, MGCF 354 or IMS-GW 356 in IMS system 350, among possible others.

Figure 4:
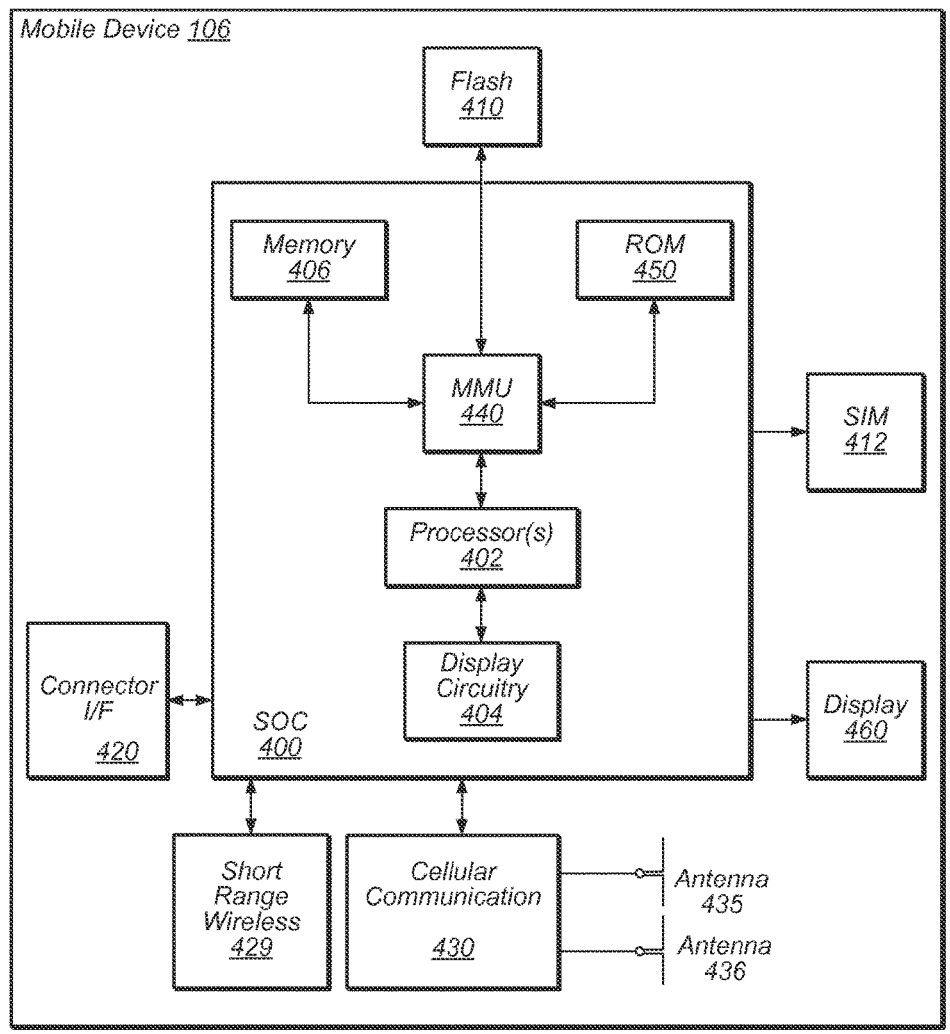
FIG. 4 illustrates an example block diagram of a UE, according to some embodiments.

FIG. 4—Example Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 440. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, connector I/F 420, and/or display 440. The MMU 440 may be configured to perform memory protection and page table translation or set up. In some embodiments, the MMU 440 may be included as a portion of the processor(s) 402.

In the embodiment shown, ROM 450 may include a bootloader, which may be executed by the processor(s) 402 during boot up or initialization. As also shown, the SOC 400 may be coupled to various other circuits of the UE 106. For example, the UE 106 may include various types of memory (e.g., including Flash memory 410), a connector interface 420 (e.g., for coupling to the computer system), the display 440, cellular communication circuitry 430 such as for LTE, GSM, CDMA2000, etc., and short range wireless communication circuitry 429 (e.g., Bluetooth™ and WLAN circuitry).

The UE device 106 may include at least one antenna, and in some embodiments multiple antennas, for performing wireless cellular communication with base stations and/or wireless communication with other devices. For example, the UE device 106 may use antenna 435 to perform the wireless cellular communication and may use antenna 436 for other wireless communication. As noted above, the UE may be configured to communicate wirelessly using multiple wireless communication standards (multiple RATs) in some embodiments.

As shown, the UE 106 may include a SIM (Subscriber Identity Module) implementation module 412, which may be configured to store and/or implement a plurality of SIMs. For example, the plurality of SIMs may include a Universal SIM (USIM) for interfacing with an LTE network, and a CDMA SIM (CSIM) for interfacing with a CDMA network. Each SIM of the plurality of SIMs 412 may be implemented as an application on the SIM implementation module 412. The SIM implementation module 412 may include a smart card, in some embodiments. The smart card may itself be referred to as a SIM card in some cases. A smart card with multiple SIM applications may sometimes be referred to as a multimode SIM card. As one example, the SIM implementation module 412 may be a Universal Integrated Circuit Card (UICC). The SIM implementation module 412 may also include (e.g., store and/or execute) one or more other applications, if desired. The SIM implementation module 412 may be removable.

Alternatively, the SIM implementation module 412 may be implemented in device hardware and/or software, wherein each SIM of the plurality of SIMs may be implemented as an embedded SIM (eSIM). For example, in some embodiments, the SIM implementation module 412 may include an embedded UICC (eUICC), e.g., a device that is built into the UE 106 and is not removable. The eUICC may be programmable, such that eSIMs may be implemented on the eUICC. In other embodiments, the SIM implementation module 412 may include software, e.g., program instructions stored on a memory medium (such as memory 406) executing on a processor (such as processor 402) in the UE 106, wherein the eSIMs (or virtual SIMs) may be installed in UE 106 as software.

The SIM implementation module 412 may include a number of types of information, potentially including personalized information specific to a user and/or device, and/or information that is common to multiple users and/or devices (e.g., of a particular cellular service provider). Some examples of information which may be included on the SIM implementation module 412 may include an International Mobile Subscriber Identity (IMSI) number which identifies the subscriber to their carrier's network; a preferred roaming list (PRL) and/or one or more public land mobile network (PLMN) files (e.g., for use in network search and selection); one or more multimode related files such as multimode system priority list (MSPL) and/or a multimode location associated priority list (MLPL). Any of a variety of other information may also or alternatively be stored on the SIM implementation module 412, as desired.

As described herein, the UE 106 may include hardware and software components for implementing methods according to embodiments of this disclosure.

The processor 402 of the UE device 106 may be configured to implement features for reducing the time to camp, such as those described herein. For example, the UE device 106 may implement such features by executing program instructions stored on a memory medium (e.g., a non-transitory computer-readable memory medium). In other embodiments, processor 402 may be configured as a programmable hardware element, such as an FPGA (Field Programmable Gate Array), or as an ASIC (Application Specific Integrated Circuit).

Figure 5:
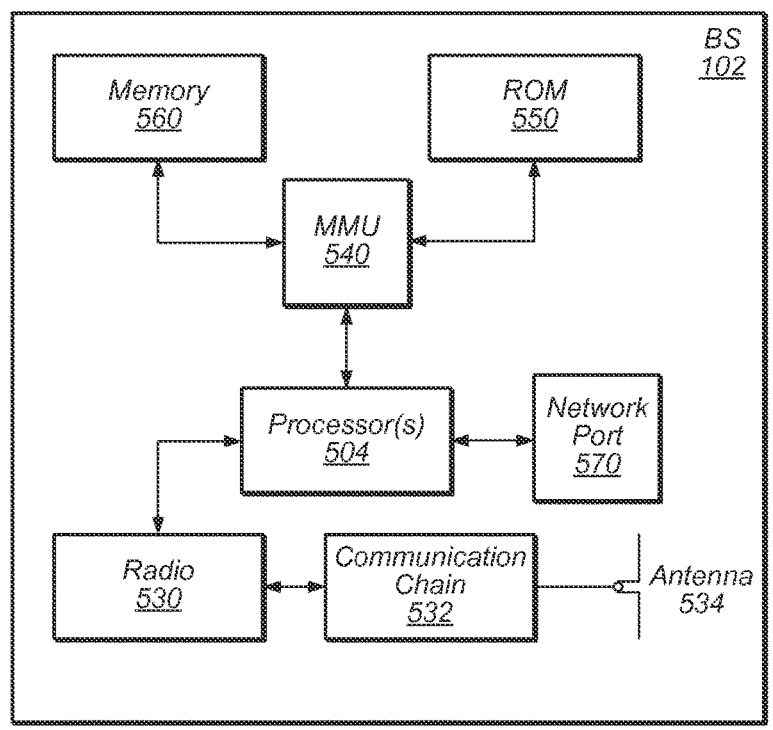
FIG. 5 illustrates an example block diagram of a base station, according to some embodiments.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

FIG. 6—Flowchart

Upon booting up (e.g., as a result of powering on, SIM refresh or update, or a SIM swap) of cellular capabilities of a UE, such as the UE 106 illustrated in and described with respect to FIGS. 1-4, the UE may typically rely on information stored on its SIM implementation module (i.e., a SIM implementation module coupled to or included in the cellular device) to access a cellular network. For example, SIM information may be used by the UE as part of the cellular communication protocols being used by the UE for cellular communication, and/or for configuration purposes.

Specifically, the SIM implementation module may include a plurality of SIM applications associated with a plurality of cellular RATs supported by the cellular device. A SIM application may include a variety of information that may be relied upon by the cellular device to access the cellular network via an associated cellular RAT. As possible examples, the SIM implementation module may include a USIM associated with a 3GPP RAT, such as LTE, which may provide, e.g., home public land mobile network (HPLMN) and/or operator controlled PLMN (OPLMN) files as part of device bootup, e.g., in order to determine network(s) to search for and/or select (e.g., to camp on) to provide cellular connectivity. Similarly, the SIM implementation module may include a CSIM associated with a 3GPP2 RAT, such as CDMA2000, which may provide, e.g., a preferred roaming list (PRL) or enhanced PRL (EPRL).

As part of cellular initialization/bootup a SIM application may be initialized for use by the cellular device. This initialization may include executing commands stored in the SIM application, and/or providing to the baseband processor of the UE information stored in the SIM application. For example, a baseband processor of the UE may read files from the SIM application, and save the files to a cache of the baseband processor. Typically, the UE may not try to connect with a cellular network until all SIM applications are ready (i.e., have completed initialization), such that the UE has received all of the relevant information stored in the SIM applications. For example, some UEs may utilize LTE for high-speed data communications, and CDMA for voice communications. Thus, the UE may not attempt to camp on a network until both the USIM (e.g., for LTE) and the CSIM (e.g., for CDMA) are ready.

In practice, it may be the case that reading files from the SIM applications as part of bootup may form a considerable portion of the total time to achieve cellular connectivity. As one example, reading SIM files might take 1-1.5 s out of an approximate 10-15 s total time to cellular connectivity, or approximately 10%. Note that numerous other SIM file reading times (e.g., 0.2 s, 0.5 s, 2 s, etc.), total times to cellular connectivity (e.g., 5 s, 8 s, 20 s, 30 s, etc.), and proportions of SIM file reading time to total time to cellular connectivity (e.g., 5%, 15%, etc.) are also possible, e.g., depending on implementation details, variable real-world conditions, and/or any of various other possible considerations.

Therefore, it may be the case that a first SIM application may initialize substantially more quickly than a second SIM application, e.g., if initializing the second SIM application includes reading more and/or larger files than initializing the first SIM application. For example, a CSIM may take a relatively long period of time to initialize, in part because initialization includes reading the EPRL file, which may be large. In some scenarios, the CSIM may take approximately 1.8-2.0 seconds to initialize. By contrast, a USIM or ISIM may, in some cases, initialize more quickly, e.g., within 300 ms.

Accordingly, it may be possible to reduce the time it takes for a UE to achieve cellular connectivity upon cellular bootup (e.g., the time to camp) by identifying and leveraging scenarios in which cellular connectivity may be achieved before all SIM applications are ready.

Figure 6:
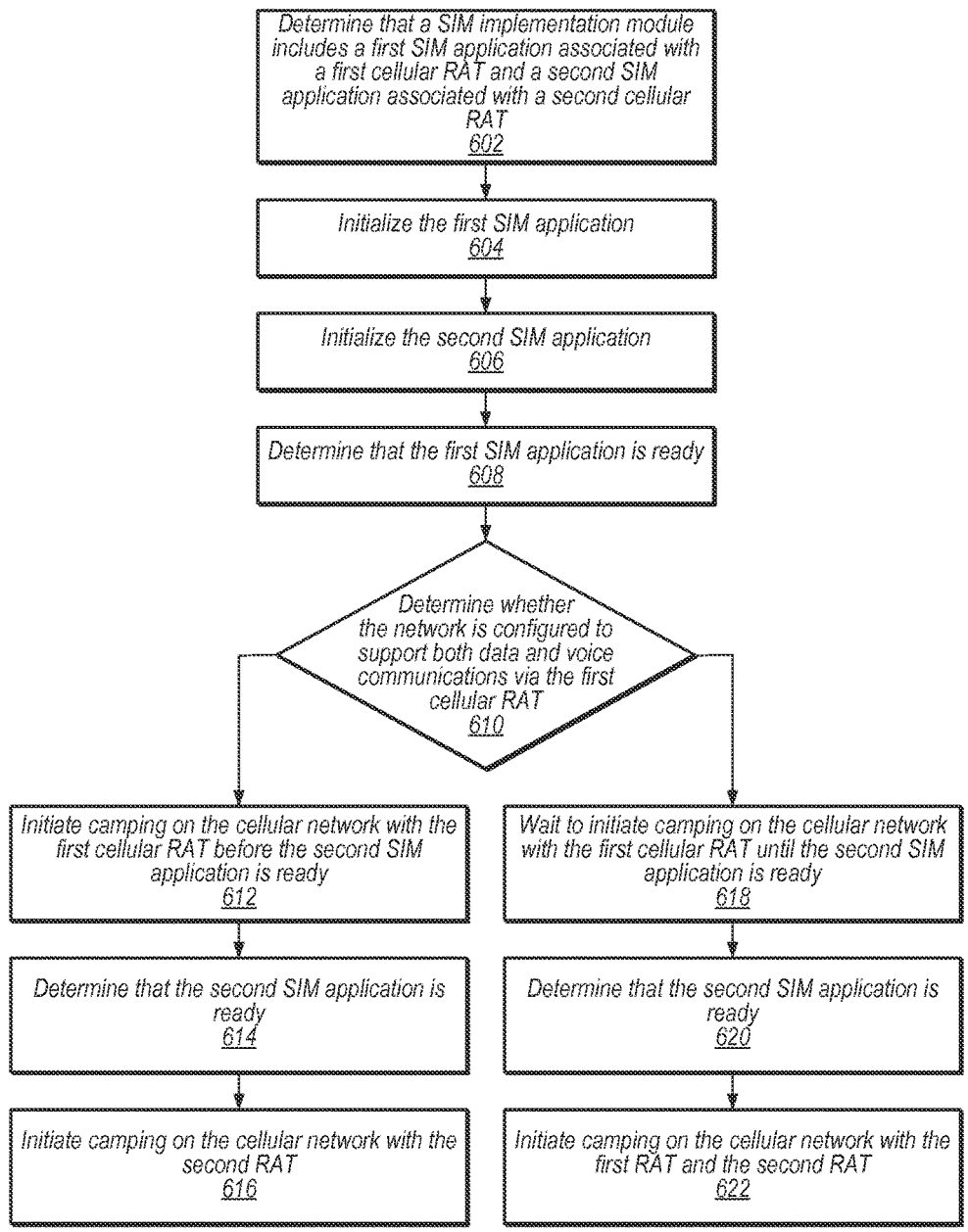
FIG. 6 is a flow chart diagram illustrating aspects of a method for a cellular device to utilize SIM applications selectively upon cellular bootup to reduce the time to camp.

FIG. 6 is a flowchart diagram illustrating a method which may be used to achieve such time savings. In particular, FIG. 6 illustrates a method for a cellular device to utilize SIM applications selectively upon cellular bootup to reduce the time to camp. The method shown in FIG. 6 may be used in conjunction with any of the computer systems or devices shown in the above Figures, among other devices. For example, the method of FIG. 6 may be implemented by a UE, such as the UE 106 of FIGS. 1-4. Some of the method elements shown may be performed concurrently, in a different order than shown, or may be omitted. Additional method elements may also be performed as desired. As shown, the methods may operate as follows.

In 602, the UE 106 may determine that a SIM implementation module 412 of the UE 106 includes a first SIM application associated with a first cellular RAT and a second SIM application associated with a second cellular RAT. For example, the UE 106 may scan the SIM implementation module 412 upon SIM bootup, which may occur, e.g., at UE bootup, SIM swap, or SIM refresh. In some embodiments, the first SIM application may include a USIM, and the second SIM application may include a CSIM. Other SIM applications are also envisioned. For example, the SIM implementation module 412 may additionally, or alternatively, include an ISIM. The SIM implementation module 412 may comprise one or more of a UICC, an eSIM, or a software module. The first and second SIM applications may, in some embodiments, include an eSIM or a virtual SIM.

In 604, the UE 106 may initialize the first SIM application. The initializing may include, e.g., executing commands stored in the first SIM application, and/or providing to the cellular communication circuitry 430 of the UE 106 information stored in the first SIM application. Specifically, the initializing may include a baseband processor of the cellular communication circuitry 430 reading one or more files from the first SIM application.

In 606, the UE 106 may initialize the second SIM application. The initializing may be generally similar to the initializing of the first SIM application in 604. However, specific details of initializing the second SIM application may vary from those of initializing the first SIM application because the first and second SIM applications may be associated with different cellular RATs. For example, if the first SIM application is a USIM and the second SIM application is a CSIM, then initializing the second SIM application will include reading different files (e.g., EPRL) than will be read during initializing of the first SIM application.

The initializing the first SIM application in 604 and the initializing the second SIM application in 606 may be initiated concurrently, or substantially concurrently. However, the first and second SIM applications may take different amounts of time to initialize.

In 608, the UE 106 may determine that the first SIM application is ready. I.e., the UE 106 may determine that the initializing of the first SIM application is complete. For example, all relevant commands stored in the first SIM application may have been executed and/or all relevant information stored in the first SIM application may have been read by the cellular communication circuitry 430.

In 610, the UE 106 may determine whether a cellular network is configured to support both data and voice communications via the first cellular RAT. For example, if the first cellular RAT is LTE, this may include determining whether the network is configured to support VoLTE communications. If the cellular network is determined to support both data and voice communications via the RAT associated with a SIM application that is fully initialized, then there may be no reason to wait for additional SIM applications to be ready.

Therefore, in some scenarios, the determining whether the network is configured to support both data and voice communications via the first cellular RAT may occur in response to the determining that the first SIM application is ready in 608. For example, the UE 106 may query the cellular network in response to the determining that the first SIM application is ready in 608. This query may be further in response to determining that the second SIM application is not ready. In other scenarios, however, the determining that the network is configured to support both data and voice communications via the first cellular RAT may occur at an earlier time. For example, the UE may determine the RATs supported by the network before initializing the first SIM application.

If the UE determines, in 610, that the network is configured to support both data and voice communications via the first cellular RAT, then in 612, the UE 106 may initiate camping on the cellular network with the first cellular RAT before the second SIM application is ready. For example, in some scenarios, the initiating camping with the first cellular RAT may be at least partly in response to determining that the first SIM application is ready, and that the second SIM application is not ready. In other scenarios, the initiating camping with the first cellular RAT may be at least partly in response to determining that the first SIM application is ready, but may be without regard to the state of readiness of the second SIM application (i.e., the initiating camping with the first cellular RAT occurs before the second SIM application is ready, but the UE 106 does not consider the state of readiness of the second SIM application in initiating camping, or deciding to initiate camping, with the first cellular RAT). The initialization of the second SIM application may continue in parallel with the UE attempting to camp on the cellular network with the first cellular RAT.

As used herein, "camping" on a network means registering on and monitoring at least a channel of the network, e.g., a control channel. By camping on a network with a specific RAT, the UE 106 is able to listen for pages for incoming communications and data transfers via that RAT on the network.

In 614, the UE 106 may determine that the second SIM application is ready. This may occur at any point following the initiating camping on the cellular network with the first cellular RAT.

In 616, the UE may initiate camping on the cellular network with the second RAT. This may be in response to the determining that the second SIM application is ready in 614.

In some scenarios, camping on the cellular network with the first RAT may fail, in which case the UE may not achieve cellular connectivity until the UE has camped on the cellular network with the second RAT. However, where initialization of the second SIM application progressed in parallel with the UE attempting to camp on the cellular network with the first cellular RAT, the UE may incur only minimal delay by attempting to camp with the first RAT before the second SIM application was ready.

If the UE determines, in 610, that the network is not configured to support both data and voice communications via the first cellular RAT, then in 618, the UE 106 may wait to initiate camping on the cellular network with the first cellular RAT until the second SIM application is ready. In 620, the UE 106 may determine that the second SIM application is ready.

In 622, the UE may initiate camping on the cellular network with both the first RAT and the second RAT simultaneously, or substantially simultaneously. This may be at least partly in response to the determining that the second SIM application is ready in 614. This may be further in response to the determining that the first SIM application is ready in 608.

It should be understood that the specific flow chart diagram illustrated in FIG. 6 and the described implementations are merely exemplary. In other scenarios, additional or alternative signaling may occur, and different communications protocols may be utilized.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE or BS) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
   at least one antenna;
   a radio coupled to the at least one antenna for performing wireless cellular communications with a cellular network;
   a subscriber identity module (SIM) implementation module coupled to the radio, the SIM implementation module storing at least a first SIM application associated with a first cellular radio access technology (RAT) and a second SIM application associated with a second cellular RAT; and
   at least one processing element coupled to the radio;
   wherein the UE is configured to:
      initialize the first SIM application;
      initialize the second SIM application; and
      initiate camping on the cellular network with the first cellular RAT before the second SIM application is ready, at least partially in response to determining that the first SIM application is ready.

2. The UE of claim 1, wherein the initiating camping on the cellular network with the first cellular RAT before the second SIM application is ready is further in response to determining that the cellular network is configured to support both data and voice communications via the first cellular RAT.

3. The UE of claim 2, wherein the first cellular RAT is LTE and wherein the determining that the cellular network is configured to support both data and voice communications via the first cellular RAT comprises determining that the cellular network is configured to support VoLTE communications.

4. The UE of claim 3, wherein the SIM implementation module further stores an IP Multimedia Services Identity Module (ISIM).

5. The UE of claim 3, wherein the first SIM application is a universal SIM (USIM) application and the second SIM application is a CDMA SIM (CSIM) application.

6. The UE of claim 2, wherein the UE is further configured to:
   wait to initiate camping on the cellular network with the first cellular RAT until the second SIM application is ready, wherein initiating camping on the cellular network with the first cellular RAT is performed substantially simultaneously with initiating camping on the cellular network with the second cellular RAT, wherein the waiting to initiate camping is at least partially in response to determining that the cellular network is not configured to support both data and voice communications via the first cellular RAT.

7. The UE of claim 1, wherein the UE is further configured to:
   initiate camping on the cellular network with the second cellular RAT in response to determining that the second SIM application is ready, after the UE has initiated camping on the cellular network with the first cellular RAT.

8. A method for camping on a cellular network, the method comprising: by a user equipment (UE):
   determining that a subscriber identity module (SIM) implementation module of the UE includes a first SIM application associated with a first cellular radio access technology (RAT) and a second SIM application associated with a second cellular RAT;
   initializing the first SIM application;
   initializing the second SIM application;
   determining that the first SIM application is ready; and
   initiating camping on the cellular network with the first cellular RAT before the second SIM application is ready, in response to determining that the first SIM application is ready.

9. The method of claim 8, wherein the initiating camping on the cellular network with the first cellular RAT before the second SIM application is ready is further in response to determining that the cellular network is configured to support both data and voice communications via the first cellular RAT.

10. The method of claim 9, wherein the first cellular RAT is LTE and wherein the determining that the cellular network is configured to support both data and voice communications via the first cellular RAT comprises determining that the cellular network is configured to support VoLTE communications.

11. The method of claim 10, wherein the SIM implementation module further stores an IP Multimedia Services Identity Module (ISIM).

12. The method of claim 10, wherein the first SIM application is a universal SIM (USIM) application and the second SIM application is a CDMA SIM (CSIM) application.

13. The method of claim 8, further comprising:
   initiating camping on the cellular network with the second cellular RAT in response to determining that the second SIM application is ready, after the UE is camped on the cellular network with the first cellular RAT.

14. The method of claim 8, wherein at least one of the first SIM application or the second SIM application is a virtual SIM.

15. A non-transitory computer readable medium storing program instructions executable by a processor of a user equipment (UE), which, when executed, cause the UE to:
   determine that a subscriber identity module (SIM) implementation module of the UE includes a first SIM application associated with a first cellular radio access technology (RAT) and a second SIM application associated with a second cellular RAT;
initialize the first SIM application;
initialize the second SIM application;
determine that the first SIM application is ready; and
initiate camping on a cellular network with the first cellular RAT before the second SIM application is ready, in response to determining that the first SIM application is ready.

16. The non-transitory computer readable medium of claim 15, wherein the initiating camping on the cellular network with the first cellular RAT before the second SIM application is ready is further in response to determining that the cellular network is configured to support both data and voice communications via the first cellular RAT.

17. The non-transitory computer readable medium of claim 16, wherein the first cellular RAT is LTE and wherein the determining that the cellular network is configured to support both data and voice communications via the first cellular RAT comprises determining that the cellular network is configured to support VoLTE communications.

18. The non-transitory computer readable medium of claim 17, wherein the first SIM application is a universal SIM (USIM) application and the second SIM application is a CDMA SIM (CSIM) application.

19. The non-transitory computer readable medium of claim 15, wherein the program instructions, when executed, further cause the UE to:
initiate camping on the cellular network with the second cellular RAT in response to determining that the second SIM application is ready, after the UE is camped on the cellular network with the first cellular RAT.

20. The non-transitory computer readable medium of claim 15, wherein at least one of the first SIM application or the second SIM application is a virtual SIM.

\* \* \* \* \*